Patented Dec. 27, 1949

2,492,190

UNITED STATES PATENT OFFICE 2,492,190

$\Delta^{20,21}$-3,17-DIOXY-11-KETOPREGNENES AND PROCESS

Lewis H. Sarett, Princeton, N. J., assignor to Merck & Co., Inc., Rahway, N. J., a corporation of New Jersey No Drawing. Original application July 14, 1945, Serial No. 605,194. Divided and this application February 23, 1946, Serial No. 649,762

5 Claims. (Cl. 260—397.4)

This invention is concerned generally with novel chemical compounds of the cyclopentanodimethylpolyhydrophenanthrene series and to processes of preparing same; more particularly it relates to novel compounds useful as intermediates in the synthesis of the adrenal cortical hormone Δ4,5-3,11,20-triketo-17(β), 21-dihydroxy pregnene. This application is a divisional of copending application Serial No. 605,194 filed July 14, 1945, now abandoned.

This hormone is known to occur naturally in the adrenal cortex; it has the structural formula:

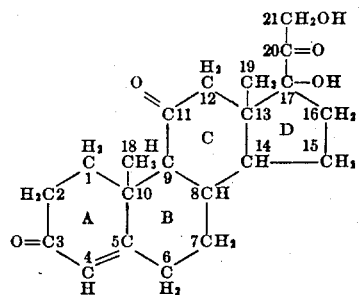

(Standard numbering of C-positions)

This formula, for purposes of convenience, is hereinafter reproduced below in the abbreviated form:

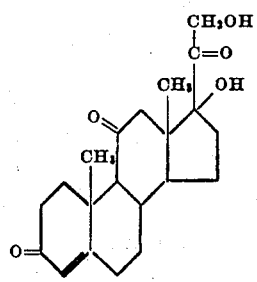

In the following description of the invention, the stereochemical relationships of substituents are indicated by the following conventions:

1. A substituent at the C-3 position which is trans to the C-10 methyl group is parenthetically designated (α).

2. A substituent at the C-17 position, the stereochemical configuration of which is identical with that of the naturally occurring adrenal hormones, is parenthetically designated (β); the epimeric configuration is designated (α). In the structural formulae the former configuration is shown by writing the C-17 substituent (hydroxyl) to the right of the C-17 carbon side chain, thus

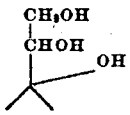

in the latter case above the side chain, thus

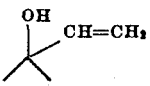

3. The stereochemical relationship of rings A and B is indicated in the formulae by a solid line representing the valence bond in the cis configuration.

In accordance with the present invention it is now found this hormone can be synthesized by reactions indicated as follows:

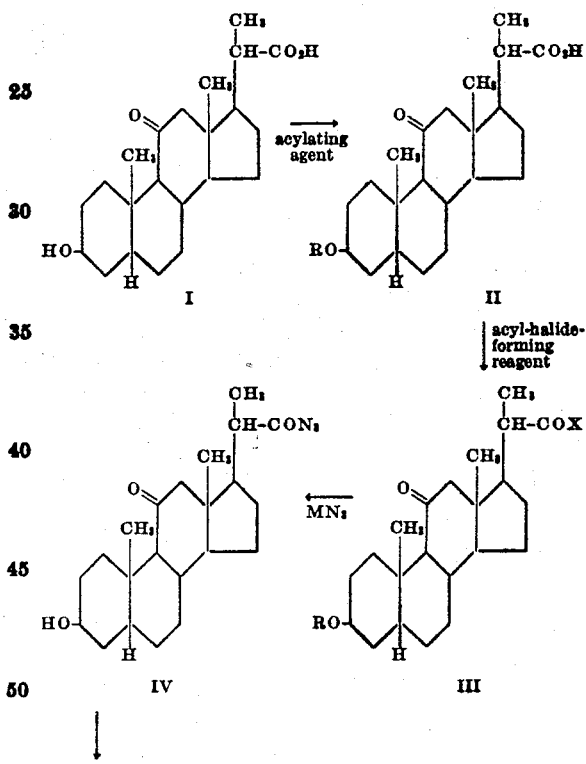

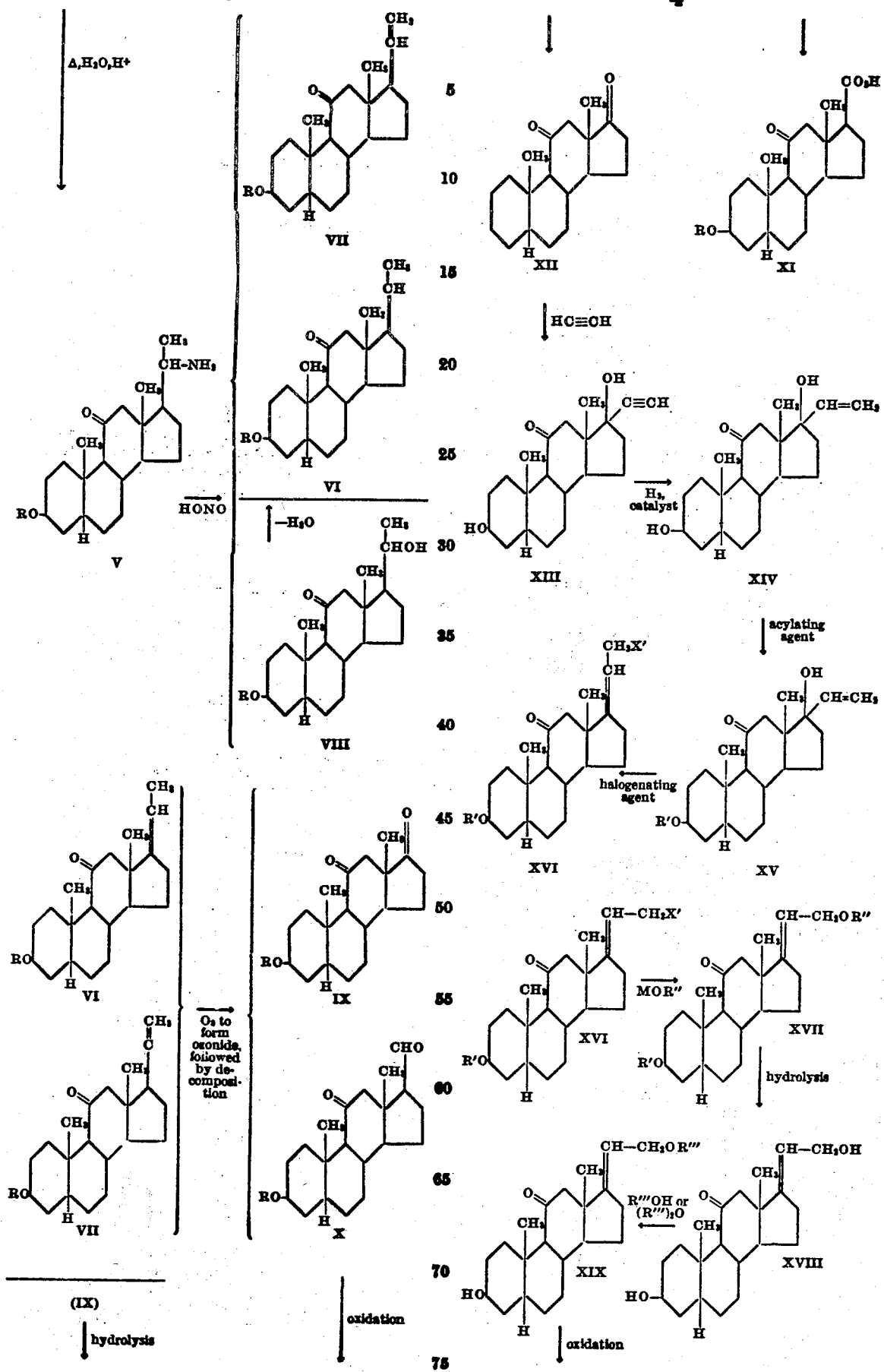

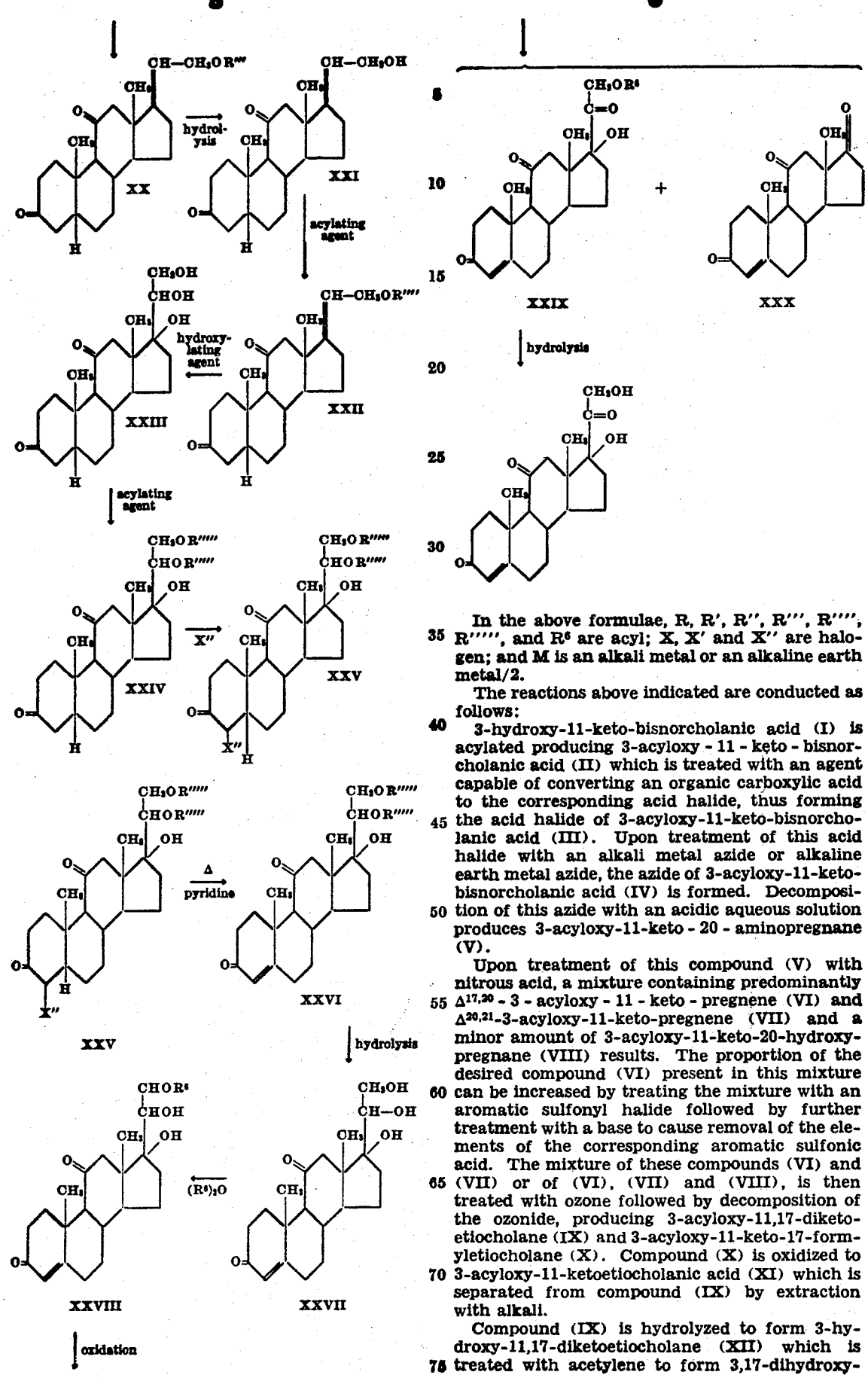

In the above formulae, R, R', R'', R''', R'''', R''''', and R⁶ are acyl; X, X' and X'' are halogen; and M is an alkali metal or an alkaline earth metal/2.

The reactions above indicated are conducted as follows:

3-hydroxy-11-keto-bisnorcholanic acid (I) is acylated producing 3-acyloxy-11-keto-bisnorcholanic acid (II) which is treated with an agent capable of converting an organic carboxylic acid to the corresponding acid halide, thus forming the acid halide of 3-acyloxy-11-keto-bisnorcholanic acid (III). Upon treatment of this acid halide with an alkali metal azide or alkaline earth metal azide, the azide of 3-acyloxy-11-keto-bisnorcholanic acid (IV) is formed. Decomposition of this azide with an acidic aqueous solution produces 3-acyloxy-11-keto-20-aminopregnane (V).

Upon treatment of this compound (V) with nitrous acid, a mixture containing predominantly $\Delta^{17,20}$-3-acyloxy-11-keto-pregnene (VI) and $\Delta^{20,21}$-3-acyloxy-11-keto-pregnene (VII) and a minor amount of 3-acyloxy-11-keto-20-hydroxypregnane (VIII) results. The proportion of the desired compound (VI) present in this mixture can be increased by treating the mixture with an aromatic sulfonyl halide followed by further treatment with a base to cause removal of the elements of the corresponding aromatic sulfonic acid. The mixture of these compounds (VI) and (VII) or of (VI), (VII) and (VIII), is then treated with ozone followed by decomposition of the ozonide, producing 3-acyloxy-11,17-diketoetiocholane (IX) and 3-acyloxy-11-keto-17-formyletiocholane (X). Compound (X) is oxidized to 3-acyloxy-11-ketoetiocholanic acid (XI) which is separated from compound (IX) by extraction with alkali.

Compound (IX) is hydrolyzed to form 3-hydroxy-11,17-diketoetiocholane (XII) which is treated with acetylene to form 3,17-dihydroxy- 11 - keto - pregnine - 20 (XIII). This compound (XIII) is catalytically hydrogenated to produce $\Delta^{20,21}$-3,17-dihydroxy-11-ketopregnene (XIV) which is acylated to form $\Delta^{20,21}$-3-acyloxy-17-hydroxy-11-ketopregnene (XV), and this compound is halogenated to produce $\Delta^{17,20}$-3-acyloxy-11-keto-21-halopregnene (XVI). When treated with an alkali metal salt or alkaline earth metal salt of an organic acid, this compound yields $\Delta^{17,20}$-3,21 - diacyloxy - 11 - ketopregnene (XVII) which is hydrolyzed producing $\Delta^{17,20}$-3,21-dihydroxy-11-ketopregnene (XVIII). The latter product (XVIII) is partially esterified and the mono ester (XIX) thus produced is oxidized to convert the unesterified hydroxy group in the 3 position to a keto group, thereby yielding the ester of $\Delta^{17,20}$-3,11 - diketo-21-acyloxy - pregnene (XX). This product (XX) is hydrolyzed and the $\Delta^{17,20}$-3,11 - diketo - 21 - hydroxypregnene (XXI) thus formed is acylated producing $\Delta^{17,20}$-3,11-diketo - 21 - acyloxypregnene (XXII). Hydroxylation at the unsaturation of the last mentioned compound (XXII) results in the production of 3,11 - diketo - 17 ($\beta$), 20,21 - trihydroxypregnene (XXIII) which is then acylated to form 3,11-diketo-17($\beta$)-hydroxy-20,21 - diacyloxypregnene (XXIV). When brominated, this compound yields 3,11-diketo-4-bromo-17($\beta$)-hydroxy-20,21-diacyloxypregnene (XXV).

This compound is then treated with a reagent capable of removing the elements of hydrogen bromide, thereby producing $\Delta^{4,5}$-3,11-diketo-17($\beta$)-hydroxy-20,21-diacyloxypregnene (XXVI) which on hydrolysis forms $\Delta^{4,5}$-3,11 - diketo-17($\beta$),20,21-trihydroxypregnene (XXVII). Partial acylation of this compound (XXVII) gives $\Delta^{4,5}$-3,11 - diketo-17($\beta$),20 - dihydroxy - 21 - acyloxypregnene (XXVIII) which, when oxidized, yields a mixture of $\Delta^{4,5}$-3,11,20-triketo-17($\beta$)-hydroxy - 21 - acyloxypregnene (XXIX) and $\Delta^{4,5}$-3,11,17-triketo androstene (XXX). Compounds (XXIX) and (XXX) may be separated by conventional operations, for example chromatography, and compound (XXIX) hydrolyzed to produce the desired adrenal hormone, $\Delta^{4,5}$-3,11,20-triketo-17($\beta$),21-dihydroxypregnene.

This invention is concerned with compounds of the type represented by the intermediates 14 and 15 above, and with processes of producing same, which intermediates are represented by the formula

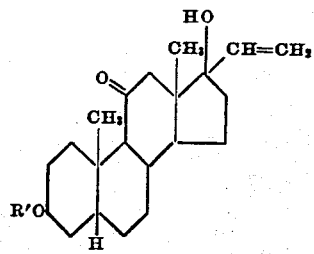

in which R' is acyl or hydrogen.

The starting materials employed in the processes according to this invention, 3,17-dihydroxy-11-ketopregnine, or a 3-acyl derivative thereof, may be obtained as described in copending application Serial No. 649,761 filed February 23, 1946.

In accordance with this invention the compound 3,17-dihydroxy-11-ketopregnine-20 or 3-acyloxy-11-keto - 17 - hydroxypregnine-20 is hydrogenated to produce $\Delta^{20,21}$-3,17-dihydroxy-11-ketopregnene or $\Delta^{20,21}$-3-acyloxy-11-keto-17-hydroxypregnene which may be represented by the structural formula:

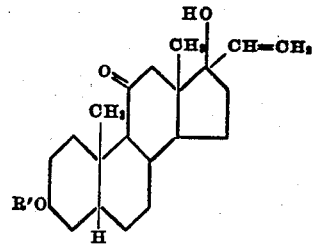

wherein R' is hydrogen or acyl.

When practicing the presently invented process the hydrogenation must be controlled to avoid having it proceed beyond the double bond stage, i. e., saturation of the 17-position substituent. It has been found that this desirable control can be effected by the use of hydrogenation catalysts of relatively low activity; for example such catalysts as catalytic forms of nickel, cobalt, platinum and palladium, of which palladium is preferred. The hydrogenation is preferably carried out at room temperature and under atmospheric pressure in a suitable solvent such as a lower aliphatic alcohol, e. g ethanol, although of course superatmospheric pressures and/or other temperatures may be employed if desired. The hydrogenation is discontinued after one mole of hydrogen has been absorbed; the triple bond is hydrogenated under the above conditions to yield the desired unsaturated compound.

3 - acyloxy - 11-keto - 17 - hydroxypregnine-20 may be hydrogenated using the same catalysts under the same conditions as hereinabove disclosed to produce $\Delta^{20,21}$-3-acyloxy-11-keto-17-hydroxypregnene. The acyl group may be any desired group derived for example from acetic, propionic, butyric, valeric, caproic, capric, etc., benzoic, toluic, or phenylacetic acid. The preferred acyl compounds are those having the radicals of the lower aliphatic carboxylic acids, i. e. those having 6 carbon atoms or less.

The following examples are illustrative of the hydrogenation procedure; it will be understood these examples are for purposes of illustration and that the invention is not limited thereto.

*Example 1*

A suspension of 300 mg. of 2% palladium-barium carbonate catalyst in 50 cc. of absolute alcohol was shaken with hydrogen until absorption of hydrogen ceased. To this suspension was then added 658 mg. of 3($\alpha$),17($\alpha$)-dihydroxy-11-ketopregnine-20 and the mixture shaken under hydrogen until one mol of hydrogen was absorbed. The catalyst was then filtered off, the alcohol partly removed in vacuo and water carefully added. The crystallized product was filtered off and recrystallized from dilute methanol. Hydrated crystals of $\Delta^{20,21}$-3($\alpha$),17($\alpha$)-dihydroxy-11-ketopregnene were thus obtained in about 95% yield. These crystals had a melting point of 111.5°–115° C. and $[\alpha]_D +43°$.

The 3-monoacetate of the above compound was prepared by warming the above compound with acetic anhydride and pyridine on the steam bath for 30 minutes. The mixture was diluted with water, extracted with ether, the ether extract washed successively with dilute hydrochloric acid and dilute potassium carbonate solution and concentrated to dryness. The residue having the structural formula:

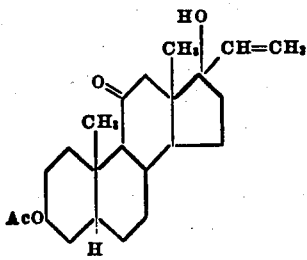

was crystallized from ethyl acetate and petroleum ether. It had a melting point 188°–190° C.

*Example 2*

680 mg. of 3(α)-acetoxy-11-keto-17-(α)-hydroxypregnine-20 having the structural formula:

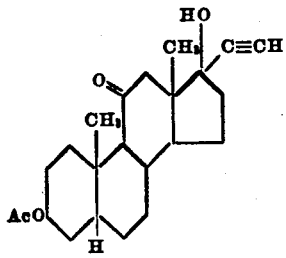

was hydrogenated following the same procedure as in Example 1 above. The product $\Delta^{20,21}$-3(α)-acetoxy-11-keto-17(α)-hydroxypregnene having the structural formula:

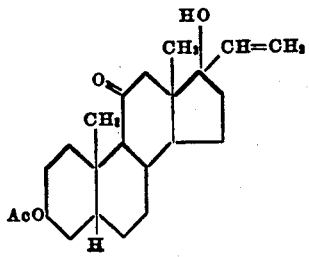

was crystallized from ethyl acetate and petroleum ether. It had a melting point of 188.5° to 190.5° C.

While in the examples the starting materials were the compounds having the 3-hydroxy or the 3-acetoxy group in trans form, a compound having this group in the cis form also may be used as the steric configurations of the group in the 3 position is not important.

The temperatures mentioned in the examples are room temperatures unless otherwise indicated. The temperatures, however, are not critical and the reactions may be carried out at higher or lower temperatures; but extremely high temperatures should be avoided because the likelihood of decomposition of the desired products which may result from operation at such temperatures.

Unless otherwise stated, the reagents can be used in different proportions than are indicated in the above examples as the proportions unless otherwise indicated are not critical, although enough of the reagents should be employed to insure substantially complete reaction to produce the desired products.

All melting points in this specification are corrected. The specific rotation for certain of the compounds in acetone solution for the D line of sodium is indicated hereinabove and is indicated by the symbol $[\alpha]_D$.

Since certain changes in carrying out the above process, and certain modifications in the intermediates which embody the invention may be made without departing from the scope of the invention, it is intended that all matter contained in the above description shall be interpreted in an illustrative and not in a limiting sense.

What is claimed is:

1. A compound of the cyclopentanoperhydrophenanthrene series having the basic structural formula:

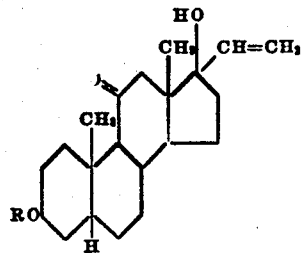

wherein R is of the class consisting of acetyl and hydrogen.

2. A compound of the cyclopentanoperhydrophenanthrene series having the basic structural formula:

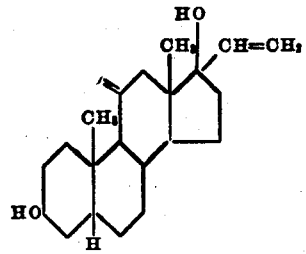

3. $\Delta^{20,21}$-3-acetoxy-11-keto-17-hydroxypregnene.

4. The process that comprises hydrogenating a compound of the cyclopentanoperhydrophenanthrene series having the basic structural formula:

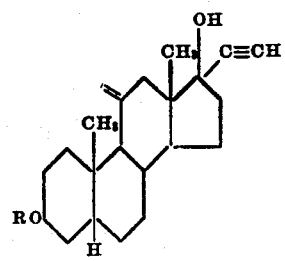

wherein R is a member of the group consisting of lower aliphatic acyl and hydrogen, using a catalyst selected from the group consisting of palladium, platinum, cobalt and nickel, under atmospheric temperature and pressure whereby an equimolar quantity of hydrogen is added to the triple bond in the substituent in the 17 position to produce a compound having the basic structural formula:

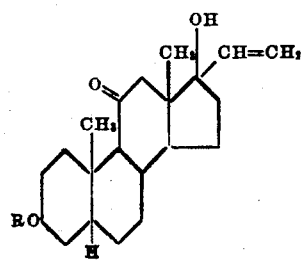

5. The process that comprises hydrogenating a compound of the cyclopentanoperhydrophenanthrene series having the basic structural formula:

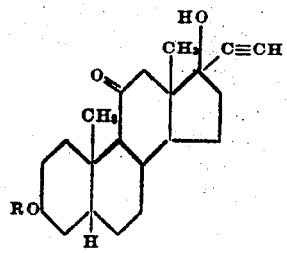

in which R is a member of the group consisting of lower aliphatic acyl and hydrogen, in the presence of a palladium catalyst at approximately room temperature and atmospheric pressure, until an equimolecular quantity of hydrogen has been absorbed by the triple bond.

LEWIS H. SARETT.

REFERENCES CITED

The following references are of record in the file of this patent:

UNITED STATES PATENTS

| Number | Name | Date |
|---|---|---|
| 2,266,778 | Logemann | Dec. 23, 1941 |
| 2,267,257 | Ruzicka | Dec. 23, 1941 |